Figure 1:
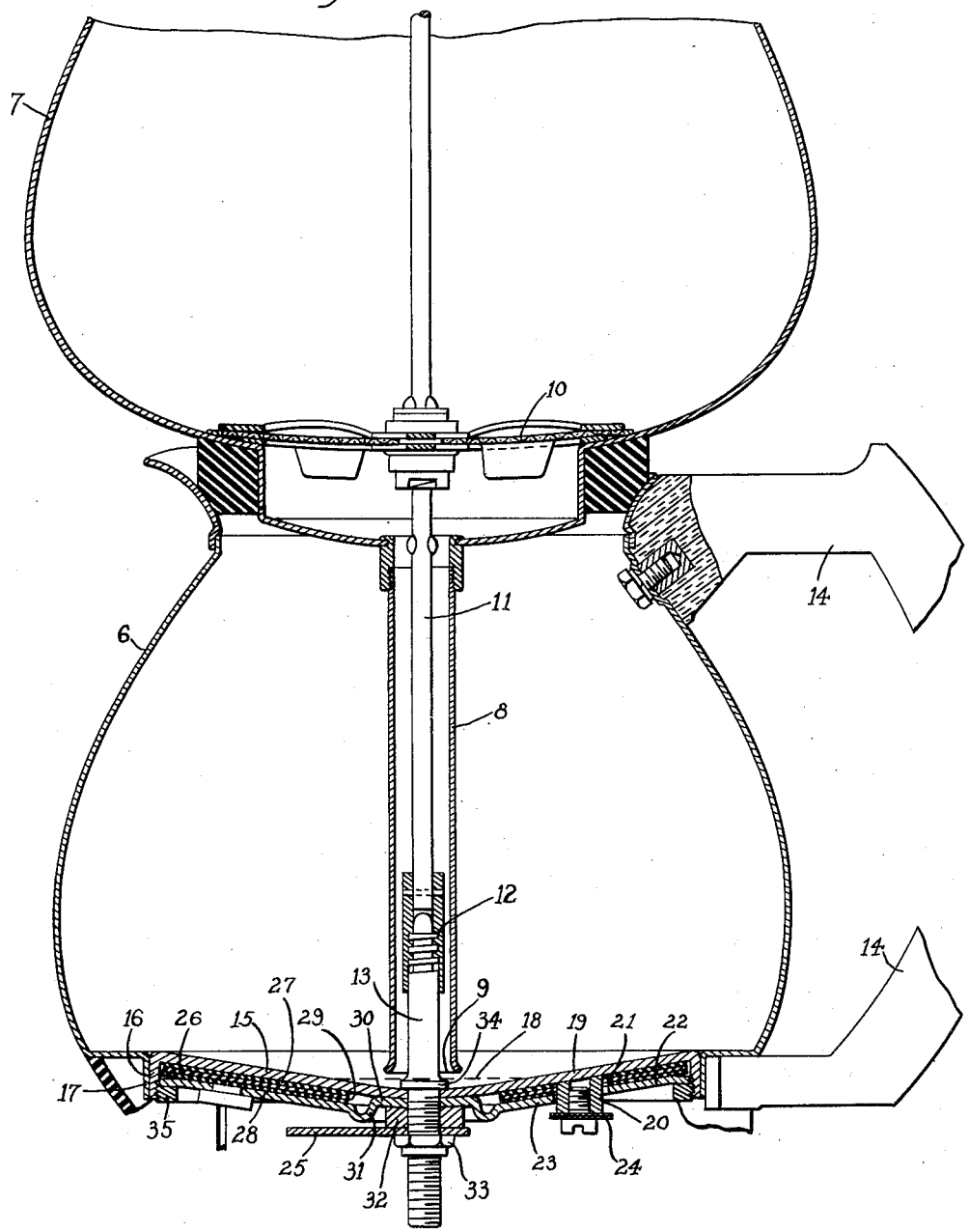

March 28, 1944.  I. JEPSON  2,345,264

COFFEE MAKER

Filed March 9, 1942

Inventor
Ivar Jepson
By McCanna, Wintercorn & Morsbach
Attys.

Patented Mar. 28, 1944

2,345,264

UNITED STATES PATENT OFFICE 2,345,264

COFFEE MAKER

Ivar Jepson, Chicago, Ill., assignor to Chicago Flexible Shaft Company, Chicago, Ill., a corporation of Illinois Application March 9, 1942, Serial No. 433,917

4 Claims. (Cl. 219—44)

This invention relates to coffeemakers and to an electric heater applied to the bottom of a liquid container such, for example, as is used in a coffeemaker.

One of the objects of my invention is to provide an improved electric heater structure of this kind, particularly with the view to improving the facility for cleaning and to make a more sanitary bottom structure.

Another object is to provide a heater structure of this kind which will have greater life without need for servicing and repair and which will be economical in cost of manufacture.

Another object is to provide an improved heater structure for application to the bottom of a coffeemaker.

Another object is to provide an improved coffeemaker characterized by its novel structure for coordinating a well for liquid residue and a thermostat in connection with a bottom wall of the liquid containing vessel.

Other objects and attendant advantages will be appreciated by those skilled in this art as the invention becomes better understood by reference to the following description when considered in connection with the accompanying drawing, in which the single figure is a fragmentary vertical section through the upper and lower vessels of a vacuum type coffeemaker embodying my invention.

The present invention while adapted for general application to heating a liquid container other than a coffeemaker is, nevertheless, specially designed for application to the lower vessel bowl of a vacuum type coffeemaker such as disclosed in Patent No. 2,312,555 granted March 2, 1943. The coffeemaker shown in said application has been manufactured and sold in large quantities and it is extensively used. It has been found, however, that the small well in the bottom of the lower vessel or pot has been the source of difficulty when cleaning and yet the presence of this well is considered highly desirable in the functioning of this device. In the present invention I have provided a lower vessel structure which retains the advantages of the small well and at the same time avoids the limitations in respect to cleaning. My improved construction enables free and easy cleaning of the bottom wall and therefore avoids the tendency for the accumulation of solid matter in corners of the well.

The parts shown in the drawing comprise, briefly stated, a lower vessel or pot 6 to the bottom of which is applied an electric heating element (which will be described more fully hereinafter), an upper vessel 7 seated in the top of the lower vessel and having a depending tube 8 which has an open lower end 9 located close to the bottom of the lower vessel, and a coffee filter 10 located in the upper vessel and having connected thereto a rod 11 which extends down through the tube 8 and is detachably connected as by means of a threaded connection 12 to an upstanding stud 13 fixed to the bottom of the lower vessel. A suitable handle 14 is attached to the lower vessel.

The use of this coffeemaker in making coffee is well known. The desired quantity of water is placed in the lower vessel. The upper vessel is then seated and fastened in the position shown. The proper quantity of ground coffee is then placed on top of the filter. The electric current is then caused to flow through the heating element and by this means the water is heated and forced up through the tube 8 into the upper vessel, producing a vacuous condition in the lower vessel. The coffee liquor brews in the upper vessel for a limited period and then flows back through the coffee grounds in the filter as a result of the vacuum action produced by cooling of the lower vessel. As taught in my abovementioned application, the electric heater is automatically controlled to heat the water regardless of the quantity and deliver the water to the upper vessel without exceeding the boiling point, brew the coffee in the upper vessel, return the water to the lower vessel within a predetermined time according to the volume, and then to maintain the coffee liquor in the lower vessel at a desired temperature for serving. Generally stated, the coffee making operation and the warming operation are automatically performed and controlled without requiring attention on the part of the operator.

According to my invention the bottom wall 15 of the lower vessel is formed to gradually slope downwardly from its peripheral edge to the center to provide a central well without the presence of upright walls or any abrupt or irregular walls which tend to obstruct cleaning operations or to collect solid matter. The bottom wall is preferably circular and of the same cross section as shown, at all radial planes. In this embodiment the peripheral edge of the bottom wall is formed to provide a depending flange 16 joined as by brazing to a corresponding flange 17 on the lower vessel. The gradual slope and arrangement of the bottom wall provides a shallow well coacting with the open end 9 of the tube 8 to insure the discharge of substantially all of the water to the upper vessel and leave only a small residue 18 in the shallow center, which small remaining quantity of water is away from the localized portion 19 at which the thermostat connects to the bottom wall. With this construction the small portion or area of the bottom wall local to the point of connection of the thermostat thereto will be quickly responsive to the rapid rise in temperature when all of the water but the small residue is discharged to the upper vessel.

This is particularly advantageous because it enables quick thermal response for shutting off the heater at this stage of the coffee making operation and it also prevents overheating. A heat conducting stud 20 brazed to the underside of the bottom wall beneath the spot 19 extends through an opening 21 in a heating element 22 and a bottom plate 23 and has attached to its lower end in good thermal contact therewith a bimetallic or thermostatic strip 24. This bimetallic strip, shown merely in cross section, is of substantial length and free at its opposite end to deflect in response to temperature changes for the purpose of controlling a switch device (not shown) in circuit with the heating element. While any suitable thermostat device and heater circuit may be used, the present invention is particularly adapted for use with a single heating element such as disclosed herein and a switch device responsive to the thermostat 24 for controlling both the coffee making operation and the warming operation as claimed in Patent No. 2,269,112. My present invention is also particularly adapted for use with a switch control device of the kind claimed in my above mentioned application. The switch device is intended to be supported mainly on a bracket 25 which in turn is mounted on the lower portion of the center stud 13. The heating element previously designated by 22, preferably of disc type, consists in this case of a resistance wire wound on a sheet of insulation material 26 and positioned between top and bottom sheets of insulation material 27 and 28, respectively. These sheets are circular discs having a central opening 29 to receive the central portion 30 which is integral with the bottom plate 23. This central portion 30 is joined to the bottom plate proper by a yieldable portion 31 such as a reverse curve bend. In this case a spacing washer 32 is interposed between the bracket 25 and the clamping portion 30. A bottom nut 33 on the lower threaded end of the stud is tightened to rigidly secure the bottom plate 23 and the switch bracket 24 to the bottom wall of the lower vessel and also to fixedly secure the stud in position, it being noted that the parts are clamped between the nut 33 and a fixed flange 34 on the stud. It will also be observed that in this construction the central portion 30 of the bottom plate may be drawn into the desired fixed position, preferably tight against the bottom wall 19, without imposing excessive pressure on the heating element. This is due to the yieldable portion 31. A clamping ring 35 threaded to the flange 16 tightens against the peripheral portion of the bottom plate and which with the central clamping means on the center stud serves to firmly clamp the heating element to the underside of the bottom wall substantially uniformly throughout the area of the heating element.

It is believed that the foregoing discloses to those skilled in this art a clear understanding of the invention; and it will be understood that this disclosure is for purpose of illustration and that the invention is not to be limited except as required by the prior art and the scope of the appended claims.

I claim:

1. An electrically heated vessel having a bottom wall gradually sloping from its peripheral portion to the center, an electric heating element applied to the underside of said bottom wall, an upper vessel having a tube depending into the lower vessel into close proximity to the center of the bottom wall for discharging water from the lower vessel to the upper vessel except for a small residue in a shallow well formed between the low center portion of the bottom wall and the lower end of the tube, and a thermostat blade beneath the heating element connected through a heat conducting stud directly to the bottom wall, the stud being joined to the bottom wall at a localized portion located beyond the area of said residue water.

2. An electrically heated vessel having a bottom wall, a disc type insulated electric heating element having a central opening, said disc type element covering substantially the entire underside of said bottom wall except for a central area thereof, a bottom plate covering the underside of the element, and means acting against the bottom plate to clamp the heat transfer side of the element against the underside of the bottom wall in good heat transfer contact therewith substantially throughout said side including clamping means having a threaded member arranged to be tightened against the bottom plate to clamp the marginal portion of the element against the bottom wall and another clamping means having a threaded member arranged to be tightened against the central portion of the bottom plate to clamp the central portion of the element against the bottom wall, the bottom plate having intermediate said central portion of the element and the application of the second mentioned clamping means a reverse curve bend providing a yielding portion serving to relieve excessive pressure against the heating element when clamping the bottom plate in position.

3. In a coffeemaker of the vacuum type having a lower vessel and an upper vessel, the upper vessel having a depending tube terminating in an open end just above the bottom of the lower vessel, the lower vessel having a bottom wall sloping inwardly and downwardly to a lowest point at the center and providing a smooth uninterrupted bottom wall extending from the outer edge to the center, a stud passing through the center of the bottom wall and extending above and below said wall, the upper end of said stud being threaded for connection to a fastening rod which coacts with the upper vessel for holding it seated on the lower vessel, an insulated heating element covering substantially the entire underside of said bottom wall except for a central area, the heating element having an opening at said central area, a bottom plate shaped to seat against the underside of the heating element and having a central portion extending across said central opening, the lower end of said stud passing downwardly through said central portion of the bottom plate, means on said lower end of the lower stud clamping the central portion of the bottom plate to clamp the interposed heating element between said wall and said plate, and means for clamping the peripheral portion of the bottom plate to the lower vessel to further clamp the heating element between said bottom plate and said bottom wall.

4. A coffeemaker structure as set forth in claim 3, in which the central portion of the bottom plate is joined to said plate proper by a reverse curve bend providing a yielding connection therebetween, whereby the central portion of the bottom plate may be clamped to position without exerting undue pressure against the interposed heating element.

IVAR JEPSON.